United States Patent
Kagawa

(10) Patent No.: US 6,869,383 B2
(45) Date of Patent: Mar. 22, 2005

(54) CONTROL APPARATUS OF AUTOMATIC TRANSMISSION

(75) Inventor: Hiroaki Kagawa, Kobe (JP)

(73) Assignee: Fujitsu Ten Limited, Kobe (JP)

( * ) Notice: Subject to any disclaimer, the term of this patent is extended or adjusted under 35 U.S.C. 154(b) by 0 days.

(21) Appl. No.: 10/188,803

(22) Filed: Jul. 5, 2002

(65) Prior Publication Data

US 2003/0013576 A1 Jan. 16, 2003

(30) Foreign Application Priority Data

Jul. 10, 2001 (JP) .................................. 2001-209409

(51) Int. Cl.⁷ .......................................... B60K 41/04
(52) U.S. Cl. .................................................. 477/115
(58) Field of Search ............................... 477/115, 120, 477/904; 701/60

(56) References Cited

U.S. PATENT DOCUMENTS

| | | | | |
|---|---|---|---|---|
| 4,471,437 A | * | 9/1984 | Yoshino et al. | 477/901 |
| 4,629,915 A | * | 12/1986 | Suzuki et al. | 327/49 |
| 4,846,022 A | * | 7/1989 | Ito et al. | 477/125 |
| 5,231,582 A | * | 7/1993 | Takahashi et al. | 701/56 |
| 5,941,793 A | * | 8/1999 | Ito et al. | 477/120 |
| 5,944,631 A | * | 8/1999 | Schafer et al. | 477/115 |
| 6,128,566 A | * | 10/2000 | Nishino | 701/52 |
| 2002/0128762 A1 | * | 9/2002 | Noguchi et al. | 701/51 |

FOREIGN PATENT DOCUMENTS

| | | | |
|---|---|---|---|
| JP | A 8-93911 | | 4/1996 |
| JP | 2001227629 A | * | 8/2001 |
| KR | 1997-26288 A | | 6/1997 |

* cited by examiner

Primary Examiner—Roger Pang
(74) Attorney, Agent, or Firm—Oliff & Berridge, PLC

(57) ABSTRACT

A control apparatus of an automatic transmission has a gear change control section for detecting an on signal of an OD off switch and performing OD off control, an OD off automatic release setting section for specifying whether or not an OD off state is to be automatically released, an automatic release set state detection section for detecting the automatic release set state in the OD off automatic release setting section, and a first OD off automatic release section for automatically releasing the OD off state when the vehicle becomes a predetermined deceleration state or vehicle stop state if the on signal of the OD off switch and the automatic release set state in the OD off automatic release setting section are detected.

10 Claims, 13 Drawing Sheets

CONTROL APPARATUS OF AUTOMATIC TRANSMISSION

The present disclosure relates to the subject matter contained in Japanese Patent Application No. 2001-209409 filed on Jul. 10, 2001, which is incorporated herein by reference in its entirety.

BACKGROUND OF THE INVENTION

1. Field of the Invention

This invention relates to a control apparatus of an automatic transmission and more particularly to a control apparatus of an automatic transmission having an overdrive (hereinafter referred to as "MOD").

2. Description of the Related Art

An automatic transmission in related art generally has a transmission having a transmission gear ratio of two to four stages and the fourth stage is put into OD designed so that the number of revolutions of output shaft becomes greater than the engine speed. Control is performed so that the OD gear of the fourth speed is entered under a predetermined condition of given speed or more during running in the drive range and fuel economy performance and quiet can be enhanced. A vehicle is provided with an OD off switch to inhibit gear change to the OD to intentionally exert the engine brake or perform smooth driving with a small number of gear change times in a control apparatus of an automatic transmission having such an OD.

FIG. 13 is a schematic drawing to show the operation state of the OD off switch placed in the vehicle. The OD off switch is placed on a shift lever, etc., and most OD off switches are of lock-type pushbutton switch form. As shown in FIG. 13(a), when the OD off switch usually is pushed and locked, the OD on state in which gear change to the OD is enabled is entered. As shown in FIG. 13(b), if the switch in the state in FIG. 13(a) is again pushed and unlocked, the OD off state in which gear change to the OD is inhibited is entered, and control for inhibiting gear change to the OD is started. At the same time, an ON/OFF indicator lamp in an instrument panel is lit. To restore to the OD on state from the OD off state, the driver again pushes the OD off switch to restore to the state in FIG. 13(a), whereby the OD off state is released and gear change to the OD is enabled and at the same time, the ON/OFF indicator lamp is switched off.

The OD off switch is provided, whereby the driver can set the switch intentionally so as to inhibit gear change to the OD; to provide the driving force with a margin by transmission control to the third speed at the acceleration time of passing, etc., or exert the engine brake at the deceleration time on a flat road or on a hill, the driver can intentionally inhibit gear change to the OD.

However, in the method in the related art wherein switch control between enabling and inhibition of gear change to the OD is performed by operating the OD off switch, once the OD off switch is operated for setting the OD off state, the state in which gear change to the OD is inhibited continues until the OD off switch is again operated for releasing inhibition of gear change to the OD and restoring to the OD on state. Thus, if the driver forgets about restoring to the OD on state after operating the OD off switch for setting the OD off state, the state in which gear change to the OD is inhibited continues and transmission control is performed at the transmission stage up to the third speed. Thus, the fuel economy performance is degraded, the content of hazardous substance in exhaust gas is also increased, and the environment is also adversely affected; this is a problem.

In the USA, it is planned that further enhancement of emission control and fuel economy improvement control will be conducted in the near term. To deal with the legal controls, if the driver forgets about restoring to the OD on state from the OD off state and drives the vehicle with the OD off state, when the driver once stops the engine and then restarts the engine, an apparatus for controlling so as to automatically release the OD off state and restore to the usual OD on state is also developed. According to such an apparatus for performing control so as to release the OD off state and restore to the OD on state at the restarting time after the engine stops, if the driver forgets about restoring to the OD on state by operating the OD off switch, the OD off state can be automatically released at the restarting time after the engine stops. However, the OD off state continues until the driver who forgets about restoring to the OD on state stops the engine after setting the OD off state by operating the OD off switch. Environment improvement made by improving the fuel economy performance for energy saving and reducing the hazardous substance in exhaust gas cannot sufficiently be intended; this is a problem.

SUMMARY OF THE INVENTION

It is an object of the invention to provide a control apparatus of an automatic transmission capable of automatically releasing an OD off state when the vehicle becomes a predetermined deceleration state or vehicle stop state after the driver performs OD off operation.

To the end, according to the invention, there is provided a control apparatus (1) of an automatic transmission having a gear change control section which detects an on signal of an overdrive (OD) off switch and performing OD off control, an OD off automatic release setting section which sets whether or not an OD off state is to be automatically released, an automatic release set state detection section which detects the automatic release set state in the OD off automatic release setting section, and an OD off automatic release section which automatically releases the OD off state when a vehicle becomes a predetermined deceleration state or vehicle is in a stop state and the on signal of the OD off switch and the automatic release set state in the OD off automatic release setting section are detected.

According to the control apparatus (1) of the automatic transmission, even if the driver does not again operate the OD off switch for releasing the OD off state, if the vehicle becomes the predetermined deceleration state or vehicle stop state, the OD off state is automatically released and when the vehicle makes the transition to the usual running state from the predetermined deceleration state or vehicle stop state, degradation of fuel economy performance caused by forgetting about releasing the OD off state can be prevented and an increase in the content of hazardous substance in exhaust gas can be prevented and adversely affecting the environment can also be decreased.

The control apparatus (2) of the automatic transmission according to the control apparatus (1), further has a vehicle speed detection section which detects vehicle speed and is connected to the OD off automatic release section, wherein when the vehicle speed detected by the vehicle speed detection section becomes equal to or less than a predetermined value, the OD off automatic release section automatically releases the OD off state.

According to the control apparatus (2) of the automatic transmission, if the vehicle speed detected by the vehicle speed detection section becomes equal to or less than the predetermined value and the vehicle becomes a sufficient deceleration state, even if the driver does not operate the OD off switch for releasing the OD off state, the OD off state is automatically released and when the vehicle makes the transition to the usual running state from the sufficient deceleration state, degradation of fuel economy performance caused by forgetting about releasing the OD off state can be prevented.

The control apparatus (3) of the automatic transmission according to the control apparatus (1), further has an engine speed detection section which detects engine speed of the vehicle and is connected to the OD off automatic release section, wherein when the engine speed detected by the engine speed detection section becomes equal to or less than a predetermined value, the OD off automatic release section automatically releases the OD off state.

According to the control apparatus (3) of the automatic transmission, if the engine speed detected by the engine speed detection section becomes equal to or less than the predetermined value and the vehicle becomes a sufficient deceleration state, even if the driver does not operate the OD off switch for releasing the OD off state, the OD off state is automatically released and when the vehicle makes the transition to the usual running state from the sufficient deceleration state, degradation of fuel economy performance caused by forgetting about releasing the OD off state can be prevented.

The control apparatus (4) of the automatic transmission according to the control apparatus (1), further has a press time measurement section which measures press time of a brake pedal of the vehicle and is connected to the OD off automatic release section, wherein when the press time of the brake pedal measured by the press time measurement section reaches a predetermined time, the OD off automatic release section automatically releases the OD off state.

According to the control apparatus (4) of the automatic transmission, if the brake pedal press time measured by the press time measurement section reaches the predetermined time and the vehicle becomes a sufficient deceleration state, even if the driver does not operate the OD off switch for releasing the OD off state, the OD off state is automatically released and when the vehicle makes the transition to the usual running state from the sufficient deceleration state, degradation of fuel economy performance caused by forgetting about releasing the OD off state can be prevented.

The control apparatus (5) of the automatic transmission according to the control apparatus (1), further has a handbrake operation detection section which detects brake operation of a handbrake of the vehicle and is connected to the OD off automatic release section, wherein when the brake operation of the handbrake is detected by the handbrake operation detection section, the OD off automatic release section automatically releases the OD off state.

According to the control apparatus (5) of the automatic transmission, if the handbrake operation is detected by the handbrake operation detection section and the vehicle becoming the vehicle stop state is detected, even if the driver does not operate the OD off switch for releasing the OD off state, the OD off state is automatically released and when the vehicle makes the transition to the usual running state from the vehicle stop state, degradation of fuel economy performance caused by forgetting about releasing the OD off state can be prevented.

The control apparatus (6) of the automatic transmission according to the control apparatus (1), further has a shift lever position detection section which detects a shift lever position of the vehicle and is connected to the OD off automatic release section, wherein when the shift lever being set to a parking position is detected by the shift lever position detection section, the OD off automatic release section automatically releases the OD off state.

According to the control apparatus (6) of the automatic transmission, if the shift lever being set to the parking position is detected by the shift lever position detection section, even if the driver does not operate the OD off switch for releasing the OD off state, the OD off state can be automatically released and when the vehicle makes the transition to the usual running state from the vehicle stop state, degradation of fuel economy performance caused by forgetting about releasing the OD off state can be prevented.

The control apparatus (7) of the automatic transmission according to the control apparatus (1), further has a vehicle speed detection section which detects vehicle speed and is connected to the OD off automatic release section, and an engine speed detection section which detects engine speed of the vehicle and is connected to the OD off automatic release section, wherein when the vehicle speed detected by the vehicle speed detection section becomes equal to or less than a predetermined value and the engine speed detected by the engine speed detection section becomes equal to or less than a predetermined value, the OD off automatic release section automatically releases the OD off state.

According to the control apparatus (7) of the automatic transmission, if the sufficient deceleration state of the vehicle is detected as the vehicle speed detected by the vehicle speed detection section becomes equal to or less than the predetermined value and the engine speed detected by the engine speed detection section becomes equal to or less than the predetermined value, even if the driver does not operate the OD off switch for releasing the OD off state, the OD off state can be automatically released and automatic releasing the OD off state before the vehicle becomes the sufficient deceleration state can be prevented.

The control apparatus (8) of the automatic transmission according to the control apparatus (1) further has a press time measurement section which measures press time of a brake pedal of the vehicle and is connected to the OD off automatic release section, and a vehicle speed detection section which detects vehicle speed and is connected to the OD off automatic release section, wherein when the press time of the brake pedal measured by the press time measurement section reaches a predetermined time and the vehicle speed detected by the vehicle speed detection section becomes equal to or less than a predetermined value, the OD off automatic release section automatically releases the OD off state.

According to the control apparatus (8) of the automatic transmission, if the sufficient deceleration state of the vehicle is detected as the press time of the brake pedal measured by the press time measurement section reaches the predetermined time and the vehicle speed detected by the vehicle speed detection section becomes equal to or less than the predetermined value, even if the driver does not operate the OD off switch for releasing the OD off state, the OD off state can be automatically released. Therefore, automatic releasing the OD off state before the vehicle becomes the sufficient deceleration state can be prevented.

The control apparatus (9) of the automatic transmission according to the control apparatus (1), further has a press time measurement section which measures the press time of a brake pedal of the vehicle and is connected to the OD off automatic release section, and an engine speed detection section which detects engine speed of the vehicle and is connected to the OD off automatic release section, wherein when the press time of the brake pedal measured by the press time measurement section reaches a predetermined time and the engine speed detected by the engine speed detection section becomes equal to or less than a predetermined value, the OD off automatic release section automatically releases the OD off state.

According to the control apparatus (9) of the automatic transmission, if the sufficient deceleration state of the vehicle is detected as the press time of the brake pedal measured by the press time measurement section reaches the predetermined time and the engine speed detected by the engine speed detection section becomes equal to or less than the predetermined value, even if the driver does not operate the OD off switch for releasing the OD off state, the OD off state can be automatically released. Therefore, automatic releasing the OD off state before the vehicle becomes the sufficient deceleration state can be prevented.

According to the invention, there is provided a control apparatus (10) of an automatic transmission having a gear change control section which detects an on signal of an overdrive (OD) off switch and performs OD off control, an OD off automatic release setting section which sets whether or not an OD off state is to be automatically released, an automatic release set state detection section which detects the automatic release set state in the OD off automatic release setting section, and a first OD off notification section which notifies a driver that the OD off state is entered, when a vehicle becomes a predetermined deceleration state and the on signal of the OD off switch and the automatic release set state in the OD off automatic release setting section are detected.

According to the control apparatus (10) of the automatic transmission, when the vehicle becomes the predetermined deceleration state, the driver can be promptly notified that the OD off state is entered, requesting the driver to operate the OD off switch for releasing the OD off state, and degradation of fuel economy performance caused by forgetting about releasing the OD off state can be prevented.

The control apparatus (11) of the automatic transmission according to the control apparatus (10) further has an OD off automatic release section which automatically releases the OD off state when the notification time of the first OD off notification section reaches a predetermined time.

According to the control apparatus (11) of the automatic transmission, if the driver is not aware of the notification given by the first OD off notification section and does not operate the switch for releasing the OD off state, the OD off state can be automatically released if the notification time reaches the predetermined time. Degradation of fuel economy performance caused by forgetting about releasing the OD off state can be prevented.

The control apparatus (12) of the automatic transmission according to the control apparatus (10), further has a shift lever position detection section which detects a shift lever position, a second notification section which notifies a driver that the shift lever is positioned at a shift stage with a gear ratio larger than a drive range, the OD off switch is turned on for setting the OD off state, the vehicle becomes the predetermined deceleration state or vehicle stop state, and the shift lever position detection section detects the shift lever being positioned at the shift stage with a gear ratio larger than the drive range.

According to the control apparatus (12) of the automatic transmission, when the ODD off state is set, the vehicle becomes the predetermined deceleration state, a shift to lower gear is made, and the shift lever being positioned at a shift stage with a gear ratio larger than the drive range is detected, the driver can be prompted to quickly change the shift lever position. Therefore, degradation of the fuel economy performance caused by the driver who forgets shifting to lower gear and drives the vehicle with the shift stage with a gear ratio larger than the drive range can be prevented, and an increase in the content of hazardous substance in exhaust gas can be prevented and adversely affecting the environment can also be decreased.

According to the invention, there is provided a control apparatus (13) of an automatic transmission having a gear change control section which detects an on signal of an overdrive (OD) off switch and performing OD off control and an OD off automatic release section which automatically releases the OD off state, when a vehicle stop state is detected in an OD off state with the OD off switch turned on.

According to the control apparatus (13) of the automatic transmission, even if the driver does not again operate the OD off switch for releasing the OD off state, the OD off state is automatically released if the vehicle becomes the vehicle stop state. When the vehicle makes the transition to the usual running state from the vehicle stop state, degradation of fuel economy performance caused by forgetting about releasing the OD off state can be prevented, an increase in the content of hazardous substance in exhaust gas can also be prevented, and adversely affecting the environment can also be decreased.

DETAILED DESCRIPTION OF THE PREFERRED EMBODIMENTS

Figure 1:
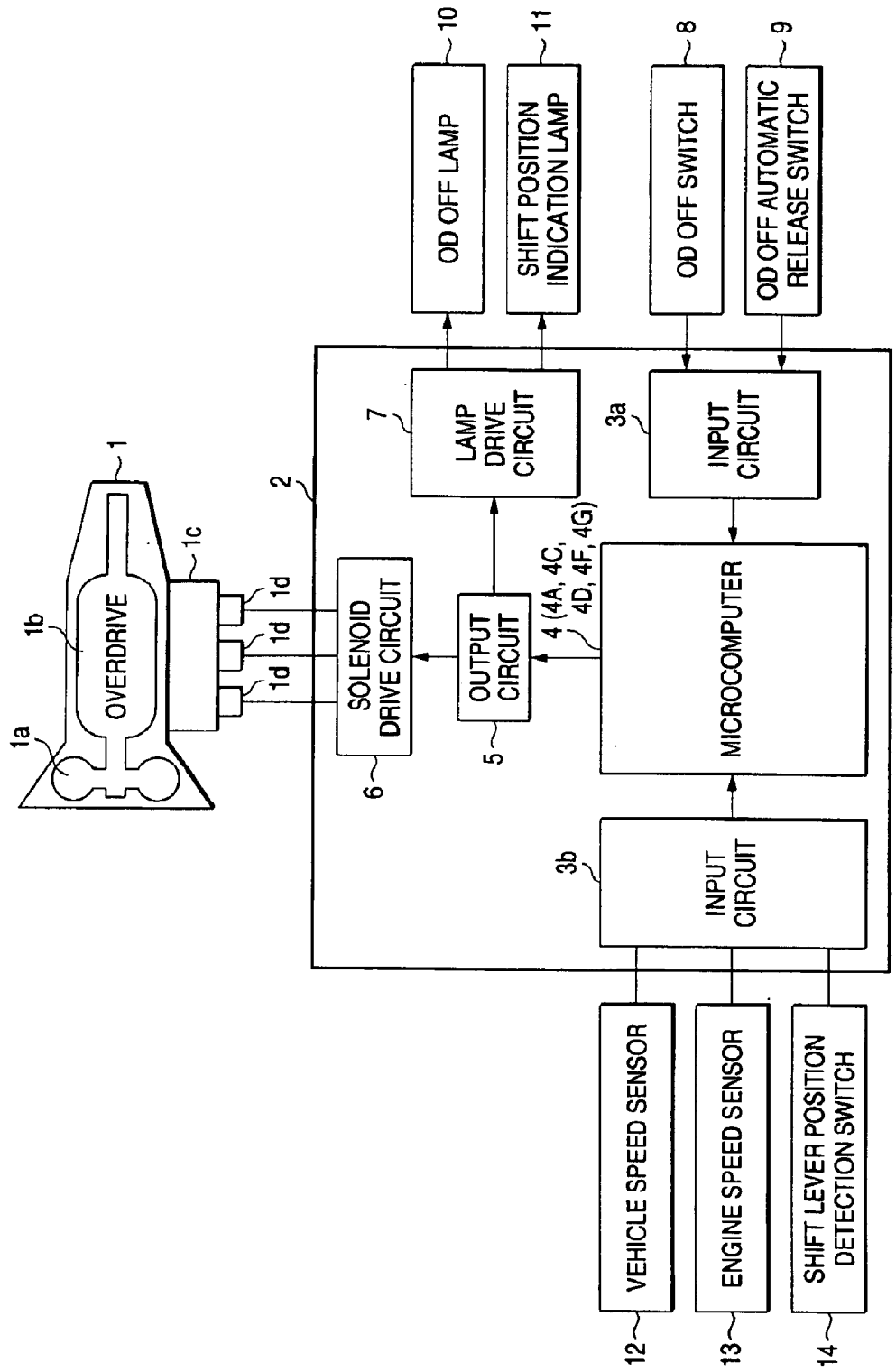
FIG. 1 is a block diagram to schematically show a system including a control apparatus of an automatic transmission according to a first embodiment of the invention.

Referring now to the accompanying drawings, there are shown preferred embodiments of control apparatus of an automatic transmission according to the invention. FIG. 1 is a block diagram to schematically show a system including a control apparatus of an automatic transmission according to a first embodiment of the invention.

In the figure, numeral 1 denotes an automatic transmission. The automatic transmission 1 has a torque converter 1a for transmitting output from an engine, a transmission 1b having a transmission gear ratio of four stages including an overdrive (OD), and a hydraulic control circuit 1c for automatically controlling the transmission gear ratio in response to the vehicle speed and engine output.

An electromagnetic solenoid 1d is built in the hydraulic control circuit 1c and is connected to a solenoid drive circuit 6 of a control unit 2. The energization state of the electromagnetic solenoid 1d is controlled based on a signal from the solenoid drive circuit 6 for controlling the gear change timing of the transmission 1b, etc.

The control unit 2 has input circuits 3a and 3b, a microcomputer 4, an output circuit 5, the solenoid drive circuit 6, a lamp drive circuit 7, etc.

An OD off switch 8 for setting an OD off state and an OD off automatic release switch 9 for specifying whether or not the OD off state is automatically released are connected to the input circuit 3a connected to the microcomputer 4.

The OD off switch 8 may be placed on a shift lever (not shown) and uses a momentary-type switch switched between OD off state and OD on state each time the switch is pressed. As the OD off switch 8 is operated, the microcomputer 4 inputs an on/off signal of the OD off switch 8 through the input circuit 3a and performs control of inhibiting or enabling gear change to the OD. The microcomputer 4 also performs lighting/switching off processing of an OD off lamp 10 through the lamp drive circuit 7.

The OD off automatic release switch 9 may placed in the instrument panel periphery, the shift lever periphery, the steering wheel periphery, or the like where the driver easily operates the switch. A lock-type pushbutton switch for setting an OD off automatic release state when the switch is pushed and releasing the OD off automatic release state when the switch is again pushed, a changeover-type pushbutton switch, etc., is adopted as the OD off automatic release switch 9. As the OD off automatic release switch 9 is operated on/off, the microcomputer 4 inputs an on/off signal of the OD off automatic release switch 9 through the input circuit 3a and can control performing or suppressing automatic releasing of the OD off state under a predetermined condition.

A vehicle speed sensor 12 for detecting vehicle speed, an engine speed sensor 13 for detecting engine speed, a shift lever position detection switch 14 for detecting the operation position of the shift lever, and the like are connected to the input circuit 3b connected to the microcomputer 4, and a signal required for controlling the automatic transmission 1 can be input to the input circuit 3b.

The OD off lamp 10 and a shift position indication lamp 11 are connected to the lamp drive circuit 7 connected to the microcomputer 4 through the output circuit 5. When the OD off state is set, the OD off lamp 10 is lit. The shift position indication lamp 11 indicates the current shift position. The lamps are indicated in a predetermined area in the instrument panel so that they are easily entered in the driver's view.

The microcomputer 4 performs various types of arithmetic processing based on the input signals from the input circuits 3a and 3b and outputs a drive signal to the electromagnetic solenoid 1d through the solenoid drive circuit 6 for controlling the energization state of the electromagnetic solenoid 1d, thereby controlling the gear change timing of the transmission 1b of the automatic transmission 1 and the transient characteristic at the gear change time.

Next, the processing operation of automatically releasing the OD off state performed by the microcomputer 4 of the control apparatus of the automatic transmission according to the first embodiment will be discussed with reference to a flowchart of FIG. 2. The processing operation is executed while the vehicle is running.

First, at step S1, whether or not an on signal of the OD off switch 8, namely, a signal for setting the OD off state is detected is determined. If it is not determined that the on signal of the OD off switch 8 is detected, control returns to step S1. On the other hand, if it is determined at step S1 that the on signal of the OD off switch 8 is detected, control goes to step S2 and the OD off lamp 10 indicating that the state is switched to the OD off state is lit and control goes to step S3.

At step S3, whether or not an on signal of the OD off automatic release switch 9, namely, a signal for setting automatic release is detected is determined. If it is determined at step S3 that the on signal of the OD off automatic release switch 9 is detected, control goes to step S4 and vehicle speed data is input from the vehicle speed sensor 12 and control goes to step S5. At step S5, whether or not the vehicle speed is equal to or less than a predetermined value is determined based on the vehicle speed data input from the vehicle speed sensor 12. If it is not determined that the vehicle speed is equal to or less than the predetermined value, control returns to step S4 and steps S4 and S5 are repeated until it is determined at step S5 that the vehicle speed is equal to or less than the predetermined value. The predetermined value is set to, for example, 10 km/h so that the vehicle can be determined to become a sufficient deceleration state.

On the other hand, if it is determined at step S5 that the vehicle speed is equal to or less than the predetermined value, control goes to step S6 and the OD off state is automatically released. Then, control goes to step S7 and the OD off lamp 10 is switched off and the processing is terminated.

On the other hand, if it is not determined at step S3 that the on signal of the OD off automatic release switch 9 is detected, control goes to step S8 and normal processing, here, OD off control due to turning on the OD off switch 8 is performed. Then, control goes to step S9 and whether or not an off signal of the OD off switch 8, namely, a signal for releasing the OD off state is detected is determined. If it is determined that the off signal of the OD off switch 8 is detected, control goes to step S7 and the OD off lamp 10 is switched off and the processing is terminated. On the other hand, if it is not determined at step S9 that the off signal of the OD off switch 8 is detected, control goes to step S3 and the above-described processing is repeated.

According to the control apparatus of the automatic transmission according to the first embodiment, even if the driver does not again operate the OD off switch 8 for releasing the OD off state, if the vehicle speed detected by the vehicle speed sensor 12 becomes equal to or less than the predetermined value and the vehicle becomes a sufficient deceleration state, the OD off state is automatically released and when the vehicle makes the transition to the usual running state from the predetermined deceleration state or vehicle stop state, degradation of fuel economy performance caused by forgetting about releasing the OD off state can be prevented and an increase in the content of hazardous substance in exhaust gas can also be prevented and adversely affecting the environment can also be decreased. The OD off automatic release switch 9 enables the driver to set automatic release of the OD off state as desired in response to the run state of the vehicle; the gear change operation responsive to the intention of the driver can be performed.

Next, a control apparatus of an automatic transmission according to a second embodiment of the invention will be discussed. The system configuration including the control apparatus of the automatic transmission according to the second embodiment is roughly similar to that previously described with reference to FIG. 1 and therefore only a microcomputer having a different function from that of the microcomputer in the first embodiment is denoted by a different reference numeral (4A) and other components will not be discussed again.

The control apparatus of the automatic transmission according to the second embodiment differs from that according to the first embodiment in microcomputer (4, 4A). In the second embodiment, the OD off state is automatically released based on the detection value of the engine speed rather than the vehicle speed.

The processing operation of automatically releasing the OD off state performed by the microcomputer 4A in the control apparatus of the automatic transmission according to the second embodiment will be discussed with reference to a flowchart of FIG. 3. Steps identical with those previously described with reference to FIG. 2 are denoted by the same step numbers in FIG. 3 and will not be discussed again.

Figure 2:
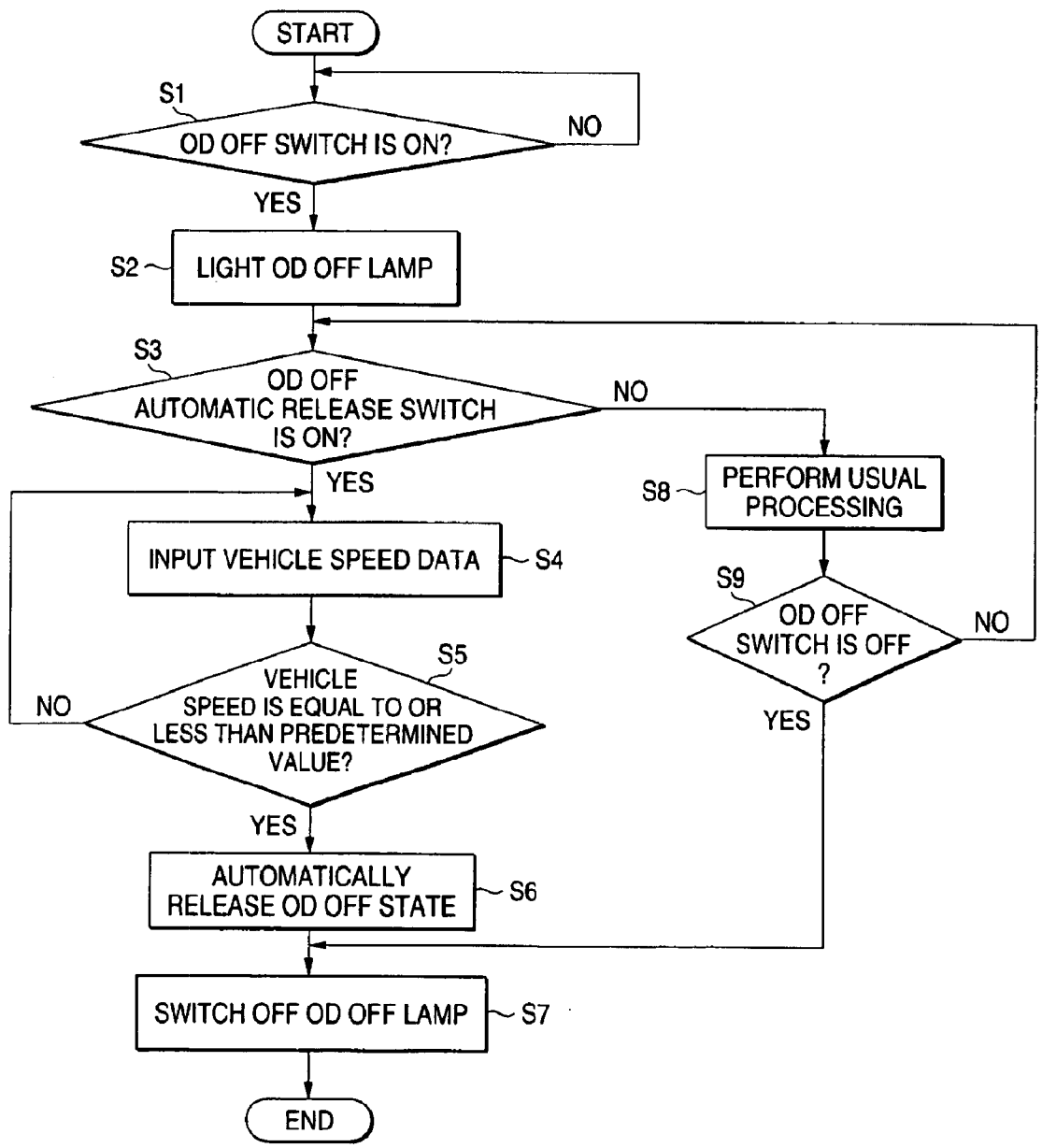
FIG. 2 is a flowchart to show the processing operation performed by a microcomputer of the control apparatus of the automatic transmission according to the first embodiment of the invention.
Figure 3:
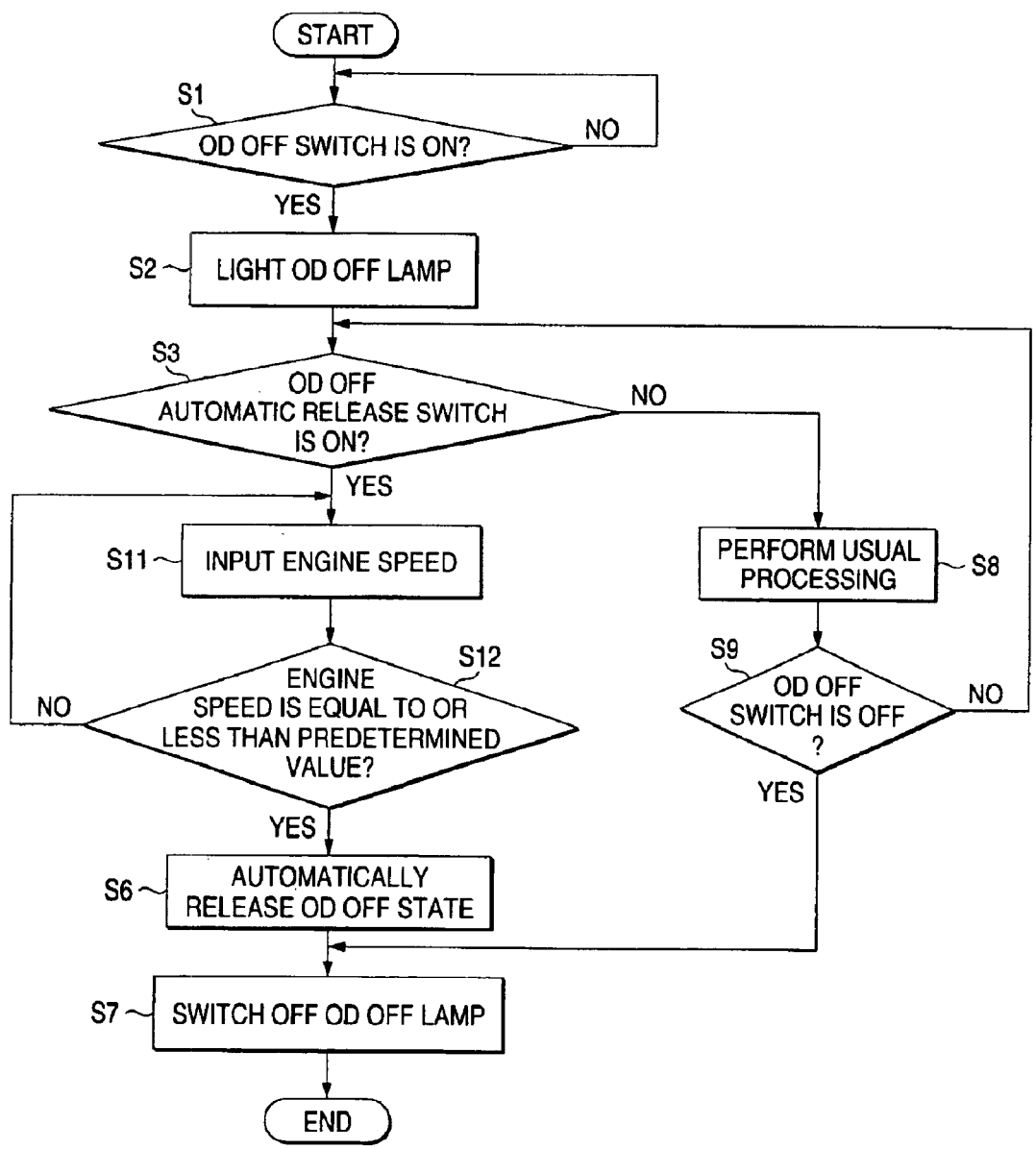
FIG. 3 is a flowchart to show the processing operation performed by a microcomputer of a control apparatus of an automatic transmission according to a second embodiment of the invention.

Steps S4 and S5 in the processing operation previously described with reference to FIG. 2 are changed to steps S11 and S12 in the processing operation of automatically releasing the OD off state performed by the microcomputer. 4A in the control apparatus of the automatic transmission according to the second embodiment.

If it is determined at step S3 that the on signal of an OD off automatic release switch 9 is detected, control goes to step S11 and the engine speed is input from an engine speed detection sensor 13 and then control goes to step S12.

At step S12, whether or not the input engine speed is equal to or less than a predetermined value is determined. If it is not determined that the engine speed is equal to or less than the predetermined value, control returns to step S11. The predetermined value may be set considering the engine characteristic of the vehicle so that the vehicle can be determined to become a sufficient deceleration state; for example, it may be set to 900 rpm or less.

On the other hand, if it is determined at step S12 that the engine speed is equal to or less than the predetermined value, control goes to step S6 and the OD off state is automatically released. Then, control goes to step S7 and an OD off lamp 10 is switched off and then the processing is terminated.

According to the control apparatus of the automatic transmission according to the second embodiment, if the engine speed detected by the engine speed sensor 13 becomes equal to or less than the predetermined value and the vehicle becomes a sufficient deceleration state, even if the driver does not operate an OD off switch 8 for releasing the OD off state, the OD off state can be automatically released and an advantage roughly similar to that in the first embodiment can be provided.

Figure 4:
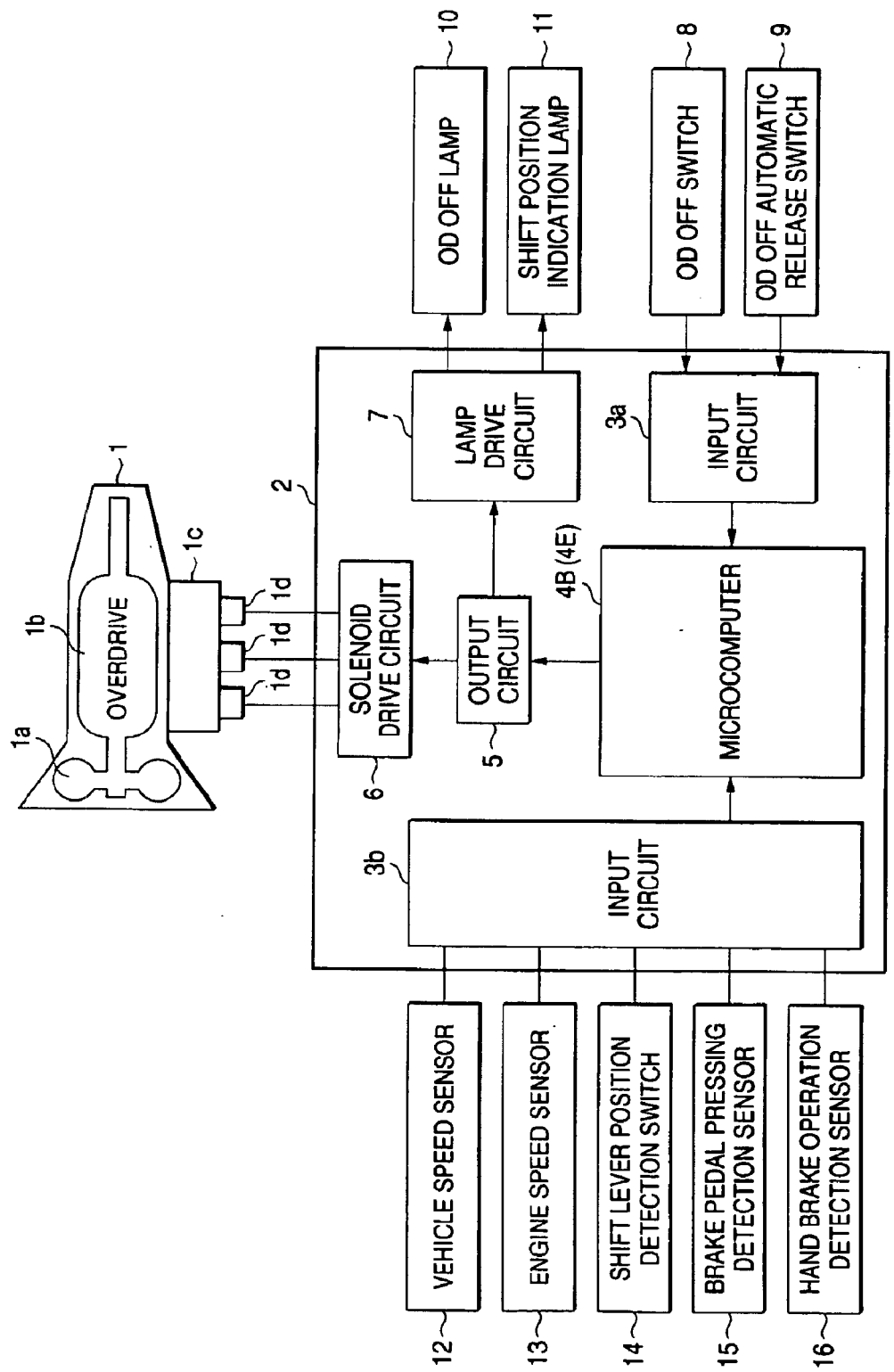
FIG. 4 is a block diagram to schematically show a system including a control apparatus of an automatic transmission according to a third embodiment of the invention.

FIG. 4 is a block diagram to show the system configuration including a control apparatus of an automatic transmission according to a third embodiment of the invention. The system configuration differs from that previously described with reference to FIG. 1 in that a brake pedal pressing detection sensor 15 for detecting the press state of a brake pedal is connected to an input circuit 3b of a control unit 2. A microcomputer having a different function from that of the microcomputer in the first embodiment is denoted by a different reference numeral (4B) and components identical with those previously described with reference to FIG. 1 are denoted by the same reference numerals in FIG. 4 and will not be discussed again.

A sensor for detecting change in oil pressure caused by pressing the brake pedal (not shown) or a sensor for detecting the state of a stop lamp switch of a stop lamp (not shown) lit when the brake pedal is pressed can be adopted as the brake pedal pressing detection sensor 15.

The control apparatus of the automatic transmission according to the third embodiment differs from that according to the first embodiment in microcomputer (4, 4B). In the third embodiment, the OD off state is automatically released based on the brake pedal press state rather than the vehicle speed.

Figure 5:
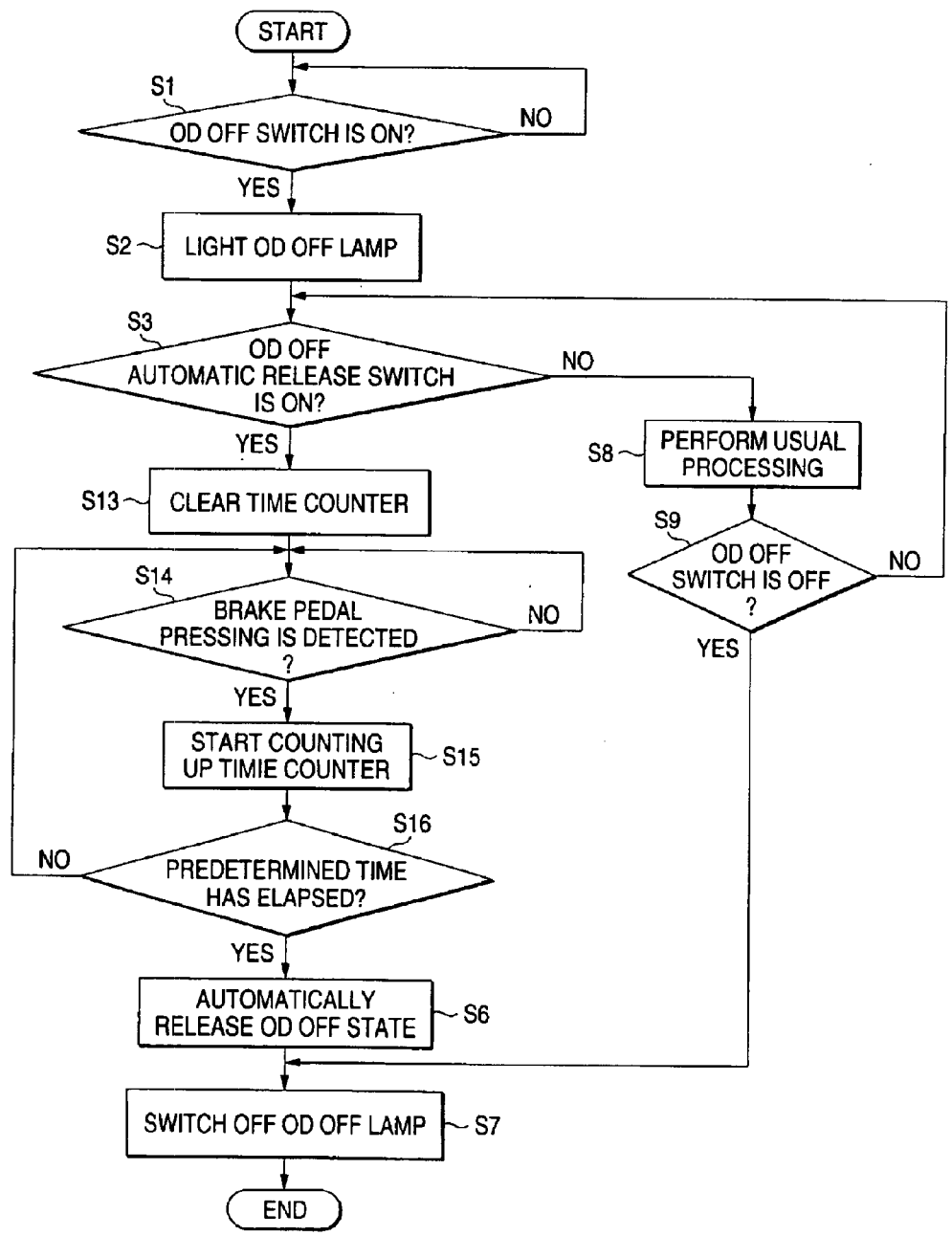
FIG. 5 is a flowchart to show the processing operation performed by a microcomputer of the control apparatus of the automatic transmission according to the third embodiment of the invention.

The processing operation of automatically releasing the OD off state performed by the microcomputer 4B in the control apparatus of the automatic transmission according to the third embodiment will be discussed with reference to a flowchart of FIG. 5. Steps identical with those previously described with reference to FIG. 2 are denoted by the same step numbers in FIG. 5 and will not be discussed again. Steps S4 and S5 in the processing operation according to the first embodiment previously described with reference to FIG. 2 are changed to steps S13 to S16 in the processing operation of automatically releasing the OD off state performed by the microcomputer 4B in the control apparatus of the automatic transmission according to the third embodiment.

If it is determined at step S3 that the on signal of an OD off automatic release switch 9 is detected, control goes to step S13 and a timer counter for time measurement is cleared and control goes to step S14.

At step S14, a signal from the brake pedal pressing detection sensor 15 is input and whether or not pressing the brake pedal is detected is determined. If it is not determined that pressing the brake pedal is detected, control returns to step S14 and the process is repeated until pressing the brake pedal is detected.

If it is determined at step S14 that pressing the brake pedal is detected, control goes to step S15 and the timer counter for measuring the press time starts counting up and then control goes to step S16. At step S16, whether or not a predetermined time of the press time has elapsed since the timer counter started counting up is determined. If it is not determined that the predetermined time has elapsed, control returns to step S14 and steps S15 and S16 are repeated. As the predetermined time in this case, the time taken for allowing the vehicle to be sufficiently decelerated as the brake pedal is pressed may be set; for example, it can be set to about three to five seconds.

On the other hand, if it is determined at step S16 that the predetermined time has elapsed, control goes to step S6 and the OD off state is automatically released. Then, control goes to step S7 and an OD off lamp 10 is switched off and then the processing is terminated.

According to the control apparatus of the automatic transmission according to the third embodiment, if the brake pedal press time measured based on the on signal of the brake pedal pressing detection sensor 15 reaches the predetermined time and the vehicle becomes a sufficient deceleration state, even if the driver does not operate an OD off switch 8 for releasing the OD off state, the OD off state can be automatically released and an advantage roughly similar to that in the first embodiment can be provided.

In the third embodiment, the OD off state is automatically released based on measurement of the brake pedal press time, but the deceleration degree varies depending on the press strength. Thus, as another embodiment, a table listing the correspondences between the brake pedal press strengths and the press times is previously stored in memory (not shown) of the microcomputer 4B, the actual press strength is looked up in the table to find the corresponding press time, and whether or not the press time has elapsed is determined, whereby if the deceleration degree varies, whenever the vehicle becomes a constant deceleration state, the OD off state can be automatically released and the control accuracy can be enhanced.

In the third embodiment, the break pedal press state is detected. However, in another embodiment, instead of detecting the break pedal press state, handbrake operation detection sensor 16 is connected to the input circuit 3b of the control unit 2 so that an operation signal of a handbrake can be input, and handbrake operation is detected instead of detecting pressing the brake pedal, whereby the vehicle stop state rather than the vehicle deceleration state may be detected for automatically releasing the OD off state.

Next, a control apparatus of an automatic transmission according to a fourth embodiment of the invention will be discussed. The system configuration including the control apparatus of the automatic transmission according to the fourth embodiment is roughly similar to that previously described with reference to FIG. 1 and therefore only a microcomputer having a different function from that of the microcomputer in the first embodiment is denoted by a different reference numeral (4C) and other components will not be discussed again.

The control apparatus of the automatic transmission according to the fourth embodiment differs from that according to the first embodiment in microcomputer (4, 4C). In the fourth embodiment, the OD off state is automatically released based on the position of a shift lever rather than the vehicle speed.

Figure 6:
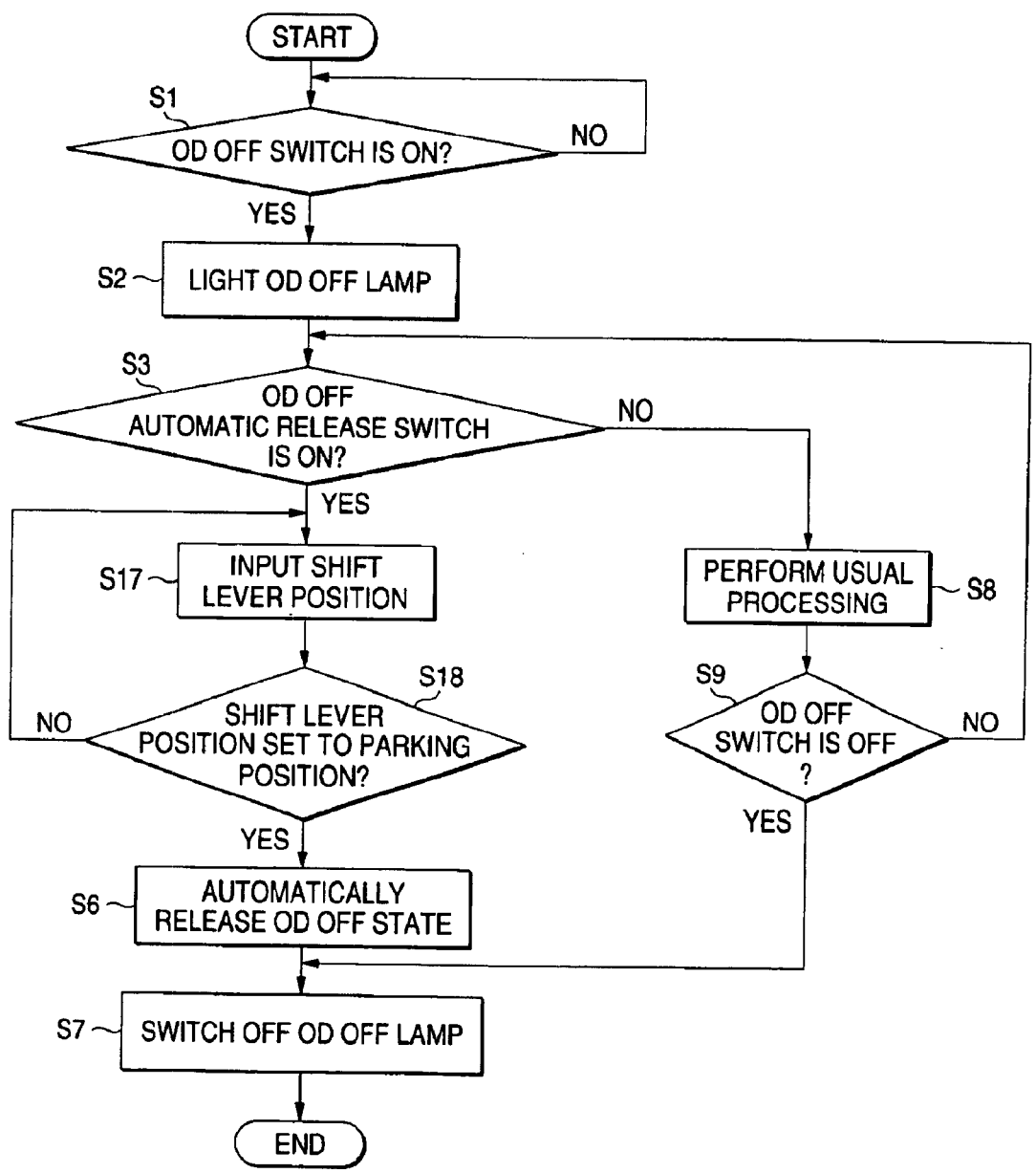
FIG. 6 is a flowchart to show the processing operation performed by a microcomputer of a control apparatus of an automatic transmission according to a fourth embodiment of the invention.

The processing operation of automatically releasing the OD off state performed by the microcomputer 4C in the control apparatus of the automatic transmission according to the fourth embodiment will be discussed with reference to a flowchart of FIG. 6. Steps identical with those previously described with reference to FIG. 2 are denoted by the same step numbers in FIG. 6 and will not be discussed again. Steps S4 and S5 in the processing operation previously described with reference to FIG. 2 are changed to steps S17 and S18 in the processing operation of automatically releasing the OD off state performed by the microcomputer 4C in the control apparatus of the automatic transmission according to the fourth embodiment.

If it is determined at step S3 that the on signal of an OD off automatic release switch 9 is detected, control goes to step S17 and the shift lever position is input from a shift lever position detection switch 14 and control goes to step S18.

At step S18, whether or not the shift lever is set to the parking position is determined. If it is not determined that the shift lever is set to the parking position, control returns to step S17 and the process of inputting the shift lever position is repeated.

If it is determined at step S18 that the shift lever is set to the parking position, control goes to step S6 and the OD off state is automatically released. Then, control goes to step S7 and an OD off lamp 10 is switched off and then the processing is terminated.

According to the control apparatus of the automatic transmission according to the fourth embodiment, if the shift lever being set to the parking position is detected by the shift lever position detection switch 14, even if the driver does not operate an OD off switch 8 for releasing the OD off state, the OD off state can be automatically released and an advantage roughly similar to that in the first embodiment can be provided.

Next, a control apparatus of an automatic transmission according to a fifth embodiment of the invention will be discussed. The system configuration including the control apparatus of the automatic transmission according to the fifth embodiment is roughly similar to that previously described with reference to FIG. 1 and therefore only a microcomputer having a different function from that of the microcomputer in the first embodiment is denoted by a different reference numeral (4D) and other components will not be discussed again.

The control apparatus of the automatic transmission according to the fifth embodiment differs from that according to the first embodiment in microcomputer (4, 4D). In the fifth embodiment, the OD off state is automatically released based on determination using the vehicle speed and the engine speed in combination.

Figure 7:
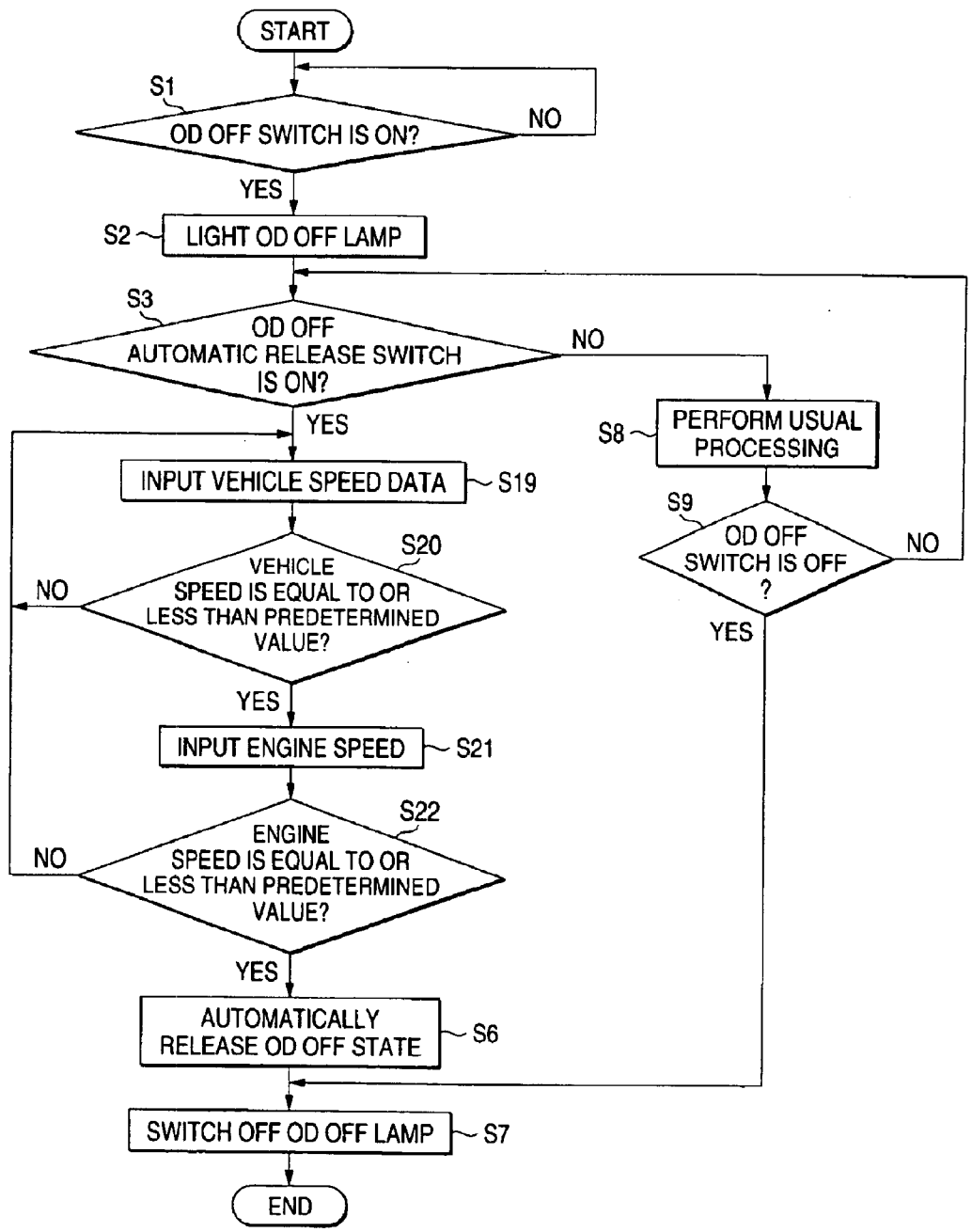
FIG. 7 is a flowchart to show the processing operation performed by a microcomputer of a control apparatus of an automatic transmission according to a fifth embodiment of the invention.

The processing operation of automatically releasing the OD off state performed by the microcomputer 4D in the control apparatus of the automatic transmission according to the fifth embodiment will be discussed with reference to a flowchart of FIG. 7. Steps identical with those previously described with reference to FIG. 2 are denoted by the same step numbers in FIG. 7 and will not be discussed again. Steps S4 and S5 in the processing operation previously described with reference to FIG. 2 are changed to steps S19 to S22 in the processing operation of automatically releasing the OD off state performed by the microcomputer 4D in the control apparatus of the automatic transmission according to the fifth embodiment.

If it is determined at step S3 that the on signal of an OD off automatic release switch 9 is detected, control goes to step S19 and the vehicle speed data is input from a vehicle speed sensor 12 and control goes to step S20.

At step S20, whether or not the input vehicle speed data is equal to or less than a predetermined value is determined.

If it is not determined that the vehicle speed is equal to or less than the predetermined value, control returns to step S19.

On the other hand, if it is determined at step S20 that the vehicle speed is equal to or less than the predetermined value, control goes to step S21 and the engine speed is input from an engine speed sensor 13 and control goes to step S22.

At step S22, whether or not the engine speed is equal to or less than a predetermined value is determined. If it is not determined that the engine speed is equal to or less than the predetermined value, control returns to step S19 and the process is repeated.

On the other hand, if it is determined at step S22 that the engine speed is equal to or less than the predetermined value, control goes to step S6 and the OD off state is automatically released. Then, control goes to step S7 and an OD off lamp 10 is switched off and then the processing is terminated.

According to the control apparatus of the automatic transmission according to the fifth embodiment, as the vehicle speed detected by the vehicle speed sensor 12 becomes equal to or less than the predetermined value and the engine speed detected by the engine speed sensor 13 becomes equal to or less than the predetermined value, the sufficient deceleration state of the vehicle is detected and even if the driver does not operate an OD off switch 8 for releasing the OD off state, the OD off state can be automatically released and automatic releasing the OD off state before the vehicle becomes the sufficient deceleration state can be prevented.

Next, a control apparatus of an automatic transmission according to a sixth embodiment of the invention will be discussed. The system configuration including the control apparatus of the automatic transmission according to the sixth embodiment is roughly similar to that previously described with reference to FIG. 4 and therefore only a microcomputer having a different function from that of the microcomputer in the third embodiment is denoted by a different reference numeral (4E) and other components will not be discussed again.

The control apparatus of the automatic transmission according to the sixth embodiment differs from that according to the third embodiment in microcomputer (4B, 4E). In the sixth embodiment, the OD off state is automatically released based on determination using the brake pedal press state and the vehicle speed in combination.

Figure 8:
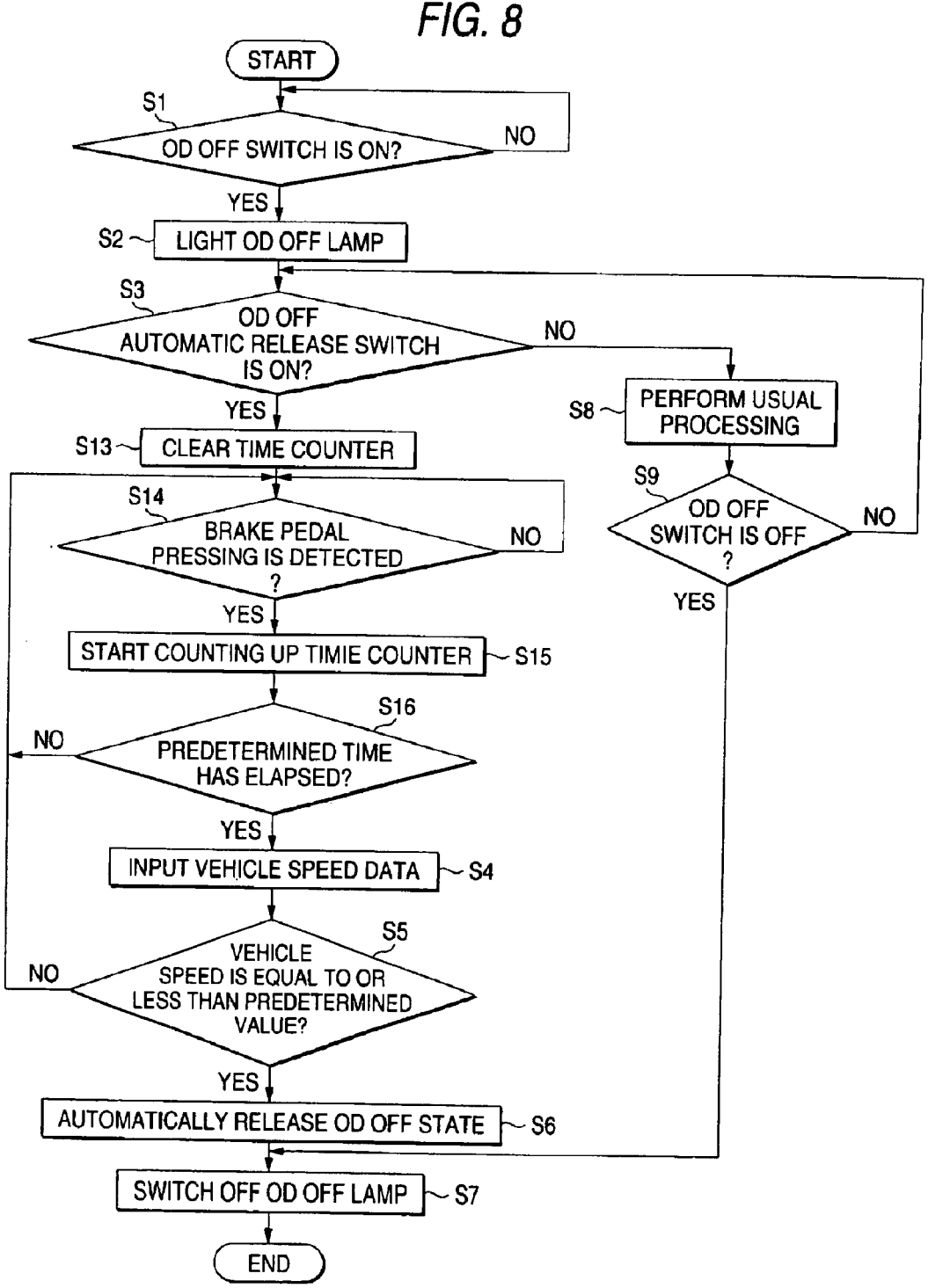
FIG. 8 is a flowchart to show the processing operation performed by a microcomputer of a control apparatus of an automatic transmission according to a sixth embodiment of the invention.

The processing operation of automatically releasing the OD off state performed by the microcomputer 4E in the control apparatus of the automatic transmission according to the sixth embodiment will be discussed with reference to a flowchart of FIG. 8. Steps identical with those previously described with reference to FIG. 5 are denoted by the same step numbers in FIG. 8 and will not be discussed again. As the processing operation of automatically releasing the OD off state performed by the microcomputer 4E in the control apparatus of the automatic transmission according to the sixth embodiment, steps S4 and S5 in the processing operation previously described with reference to FIG. 2 are inserted between steps S16 and S6 in the processing operation previously described with reference to FIG. 5.

At step S16, whether or not a predetermined time has elapsed since the brake pedal was pressed is determined. If it is not determined that the predetermined time has elapsed, control returns to step S14. The predetermined time is preset to the time taken for allowing the vehicle to be sufficiently decelerated as the brake pedal is pressed.

On the other hand, if it is determined at step S16 that the predetermined time has elapsed, control goes to step S4 and vehicle speed data is input from a vehicle speed sensor 12 and then control goes to step S5. At step S5, whether or not the input vehicle speed is equal to or less than a predetermined value is determined. If it is not determined that the vehicle speed is equal to or less than the predetermined value, control returns to step S14 and the process is repeated.

On the other hand, it is determined at step S5 that the vehicle speed is equal to or less than the predetermined value, control goes to step S6 and the OD off state is automatically released. Then, control goes to step S7 and an OD off lamp 10 is switched off and then the processing is terminated.

According to the control apparatus of the automatic transmission according to the sixth embodiment, if the brake pedal press time measured based on the on signal of the brake pedal pressing detection sensor 15 reaches the predetermined time and the vehicle speed detected by the vehicle speed sensor 12 becomes equal to or less than the predetermined value and the vehicle becomes a sufficient deceleration state, even if the driver does not operate an OD off switch 8 for releasing the OD off state, the OD off state can be automatically released. Therefore, the OD off state is not automatically released in a state in which the vehicle is not sufficiently decelerated as the brake pedal is softly pressed, etc. The OD off state can be maintained until the vehicle is sufficiently decelerated, and the OD off function can be exerted sufficiently.

In the sixth embodiment, at step S4, the signal from the vehicle speed sensor 12 is received and at step S5, whether or not the vehicle speed is equal to or less than the predetermined value is determined. In another embodiment, the engine speed described in the second embodiment may be adopted in place of the vehicle speed and the determination as to the brake pedal press state and the determination as to whether or not the engine speed is equal to or less than the predetermined value may be used in combination. Also in this case, an advantage roughly similar to that in the sixth embodiment can be provided.

Next, a control apparatus of an automatic transmission according to a seventh embodiment of the invention will be discussed. The system configuration including the control apparatus of the automatic transmission according to the seventh embodiment is roughly similar to that previously described with reference to FIG. 1 and therefore only a microcomputer having a different function from that of the microcomputer in the first embodiment is denoted by a different reference numeral (4F) and other components will not be discussed again.

Figure 9:
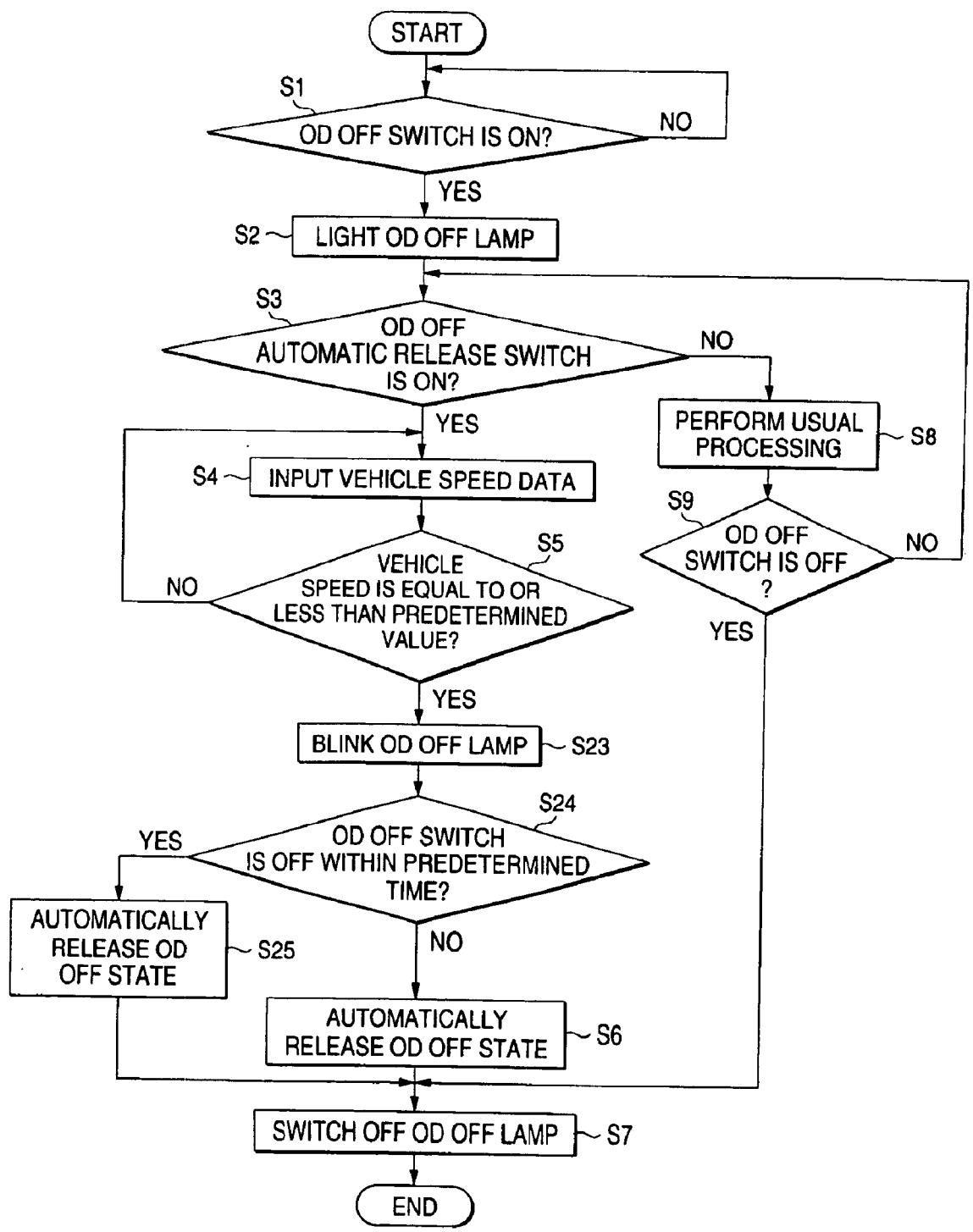
FIG. 9 is a flowchart to show the processing operation performed by a microcomputer of a control apparatus of an automatic transmission according to a seventh embodiment of the invention.

The control apparatus of the automatic transmission according to the seventh embodiment differs from that according to the first embodiment in microcomputer (4, 4F). In the seventh embodiment, when the vehicle speed becomes equal to or less than a predetermined value, before the OD off state is automatically released, first the driver is notified that the OD off state may be released, and if the driver does not operate an OD off switch 8 for releasing the OD off state although the driver is notified, the OD off state is automatically released The processing operation of automatically releasing the OD off state performed by the microcomputer 4F in the control apparatus of the automatic transmission according to the seventh embodiment will be discussed with reference to a flowchart of FIG. 9. Steps identical with those previously described with reference to FIG. 2 are denoted by the same step numbers in FIG. 9 and will not be discussed again. As the processing operation of automatically releasing the OD off state performed by the microcomputer 4F in the control apparatus of the automatic transmission according to the seventh embodiment, steps S23 to S25 are inserted between steps S5 and S6 in the processing operation previously described with reference to FIG. 2.

If it is determined at step S5 that the vehicle speed is equal to or less than the predetermined value, control goes to step S23 and an OD off lamp 10 which is lit is blinked, cautioning the driver to operate the OD off switch 8 for releasing the OD off state. Then, control goes to step S24. At step S24, whether or not the driver operates the OD off switch 8 for releasing the OD off state within a predetermined time since blinking the OD off lamp 10 was started is determined. If it is determined that the driver operates the OD off switch. 8 for releasing the OD off state within the predetermined time, control goes to step S25 and the OD off state is released. Then, control goes to step S7 and the OD off lamp 10 is switched off.

On the other hand, it is not determined at step S24 that the driver operates the OD off switch 8 for releasing the OD off state within the predetermined time, control goes to step S6 and the OD off state is automatically released. Then, control goes to step S7 and the OD off lamp 10 is switched off and then the processing is terminated.

According to the control apparatus of the automatic transmission according to the seventh embodiment, when the vehicle becomes the predetermined deceleration state, the OD off lamp 10 can be blinked, etc., for promptly notifying the driver that the OD off state is entered and requesting the driver to operate the OD off switch 8 for releasing the OD off state. If the driver is not aware of the notification given by blinking the OD off lamp 10, etc., and does not operate the switch for releasing the OD off state, the OD off state can be automatically released if the notification time reaches a predetermined time; an advantage roughly similar to that in the first embodiment can be provided.

Next, a control apparatus of an automatic transmission according to an eighth embodiment of the invention will be discussed. The system configuration including the control apparatus of the automatic transmission according to the eighth embodiment is roughly similar to that previously described with reference to FIG. 1 and therefore only a microcomputer having a different function from that of the microcomputer in the first embodiment is denoted by a different reference numeral (4G) and other components will not be discussed again.

The control apparatus of the automatic transmission according to the eighth embodiment differs from that according to the first embodiment in microcomputer (4, 4G). In the eighth embodiment, before the OD off state is automatically released, the shift lever position is detected and whether or not a shift to lower gear is made is determined. If a shift to lower gear is made, the driver is cautioned to restore the shift to lower gear to the former state as notification processing.

Figure 10:
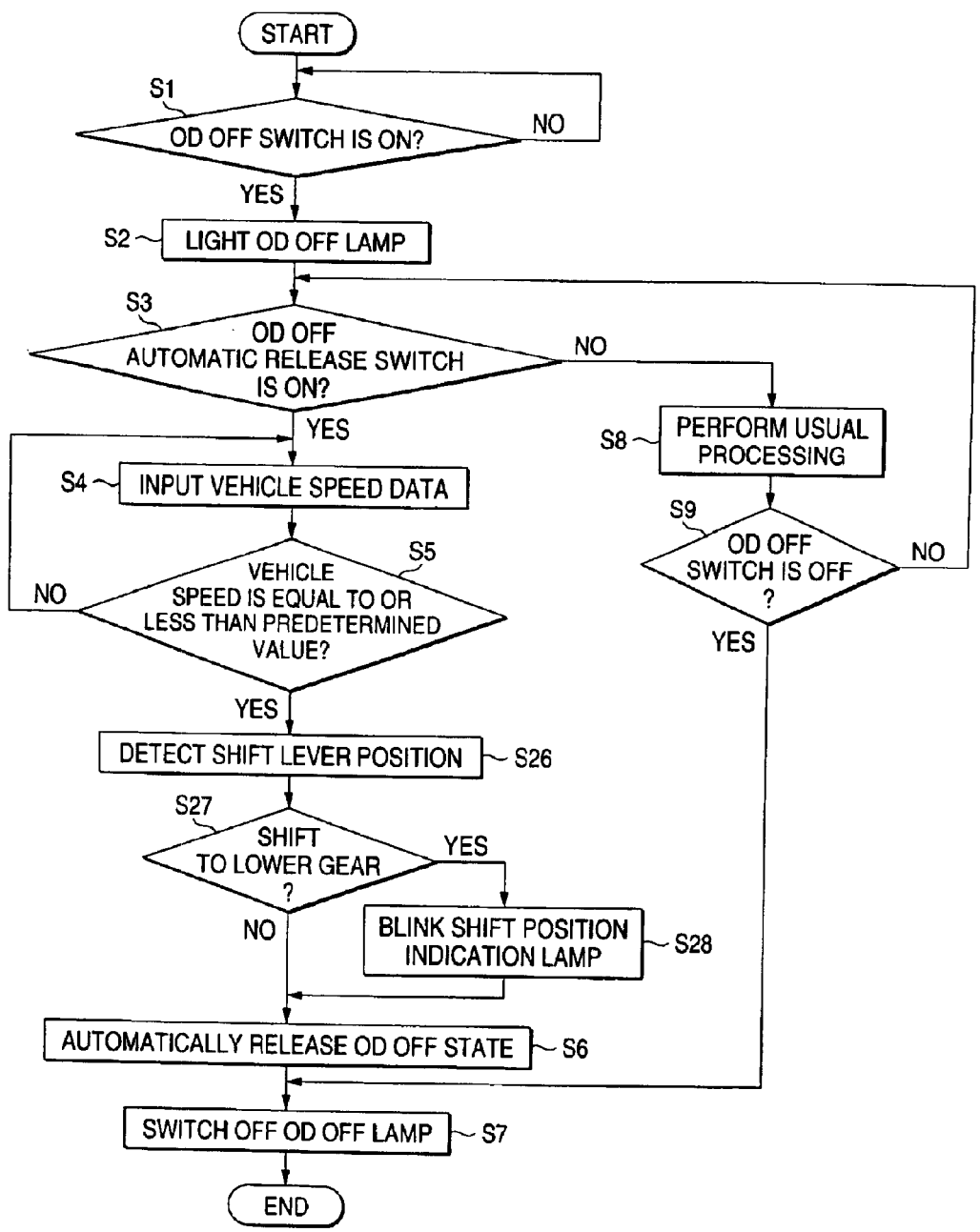
FIG. 10 is a flowchart to show the processing operation performed by a microcomputer of a control apparatus of an automatic transmission according to an eighth embodiment of the invention.

The processing operation of automatically releasing the OD off state performed by the microcomputer 4G in the control apparatus of the automatic transmission according to the eighth embodiment will be discussed with reference to a flowchart of FIG. 10. Steps identical with those previously described with reference to FIG. 2 are denoted by the same step numbers in FIG. 10 and will not be discussed again. As the processing operation of automatically releasing the OD off state performed by the microcomputer 4G in the control apparatus of the automatic transmission according to the eighth embodiment, steps S26 to S28 are inserted between steps 35 and S6 in the processing operation previously described with reference to FIG. 2.

If it is determined at step S5 that the vehicle speed is equal to or less than a predetermined value, control goes to step S26 and the shift lever position is detected and then control goes to step S27. At step S27, whether or not the shift lever position is shifted to a shift stage with a gear ratio larger than the drive range, in this case, to second or first gear position is determined. If a shift to lower gear from the drive range is not detected, control goes to step S6 and the OD off state is automatically released.

On the other hand, if it is determined at step S27 that a shift to lower gear from the drive range is detected, control goes to step S28 and to inform the driver that shift to lower gear remains, for example, the current shift position to lower gear is blink-displayed on a shift position indication lamp 11 in an instrument panel or the lit lamp color is changed for indication, calling a driver's attention. Then, control goes to step S6 and the OD off state is automatically released. Then, control goes to step S7 and an OD off lamp 10 is switched off and then the processing is terminated.

According to the control apparatus of the automatic transmission according to the eighth embodiment, when the ODD off state is set, the vehicle becomes a predetermined deceleration state, a shift to lower gear is made, and the shift lever being positioned at a shift stage with a gear ratio larger than the drive range is detected, the driver can be prompted to quickly change the shift lever position. Therefore, degradation of the fuel economy performance caused by the driver who forgets shifting to lower gear and drives the vehicle with the shift stage with a gear ratio larger than the drive range can be prevented, and an increase in the content of hazardous substance in exhaust gas can be prevented and adversely affecting the environment can also be decreased.

Figure 11:
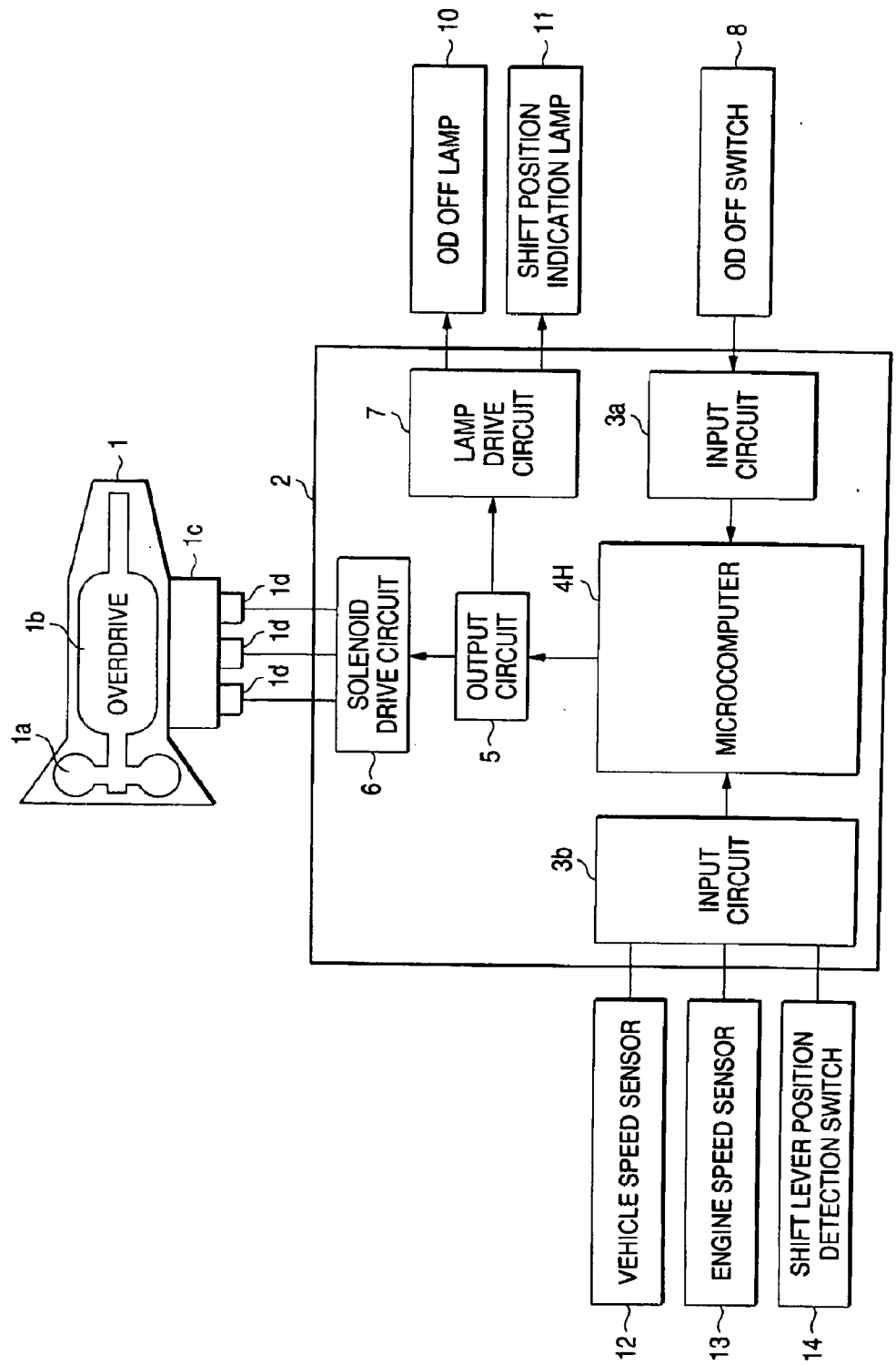
FIG. 11 is a block diagram to schematically show a system including a control apparatus of an automatic transmission according to a ninth embodiment of the invention.

FIG. 11 is a block diagram to show the system configuration including a control apparatus of an automatic transmission according to a ninth embodiment of the invention. The system configuration differs from that previously described with reference to FIG. 1 in that the OD off automatic release switch 9 is not included. A microcomputer having a different function from that of the microcomputer in the first embodiment is denoted by a different reference numeral (4H) and components identical with those previously described with reference to FIG. 1 are denoted by the same reference numerals in FIG. 11 and will not be discussed again.

The control apparatus of the automatic transmission according to the ninth embodiment differs from that according to the first embodiment in microcomputer (4,4H). In the ninth embodiment, the OD off automatic release switch 9 is not provided and when an on signal of an OD off switch 8 is detected and the vehicle becomes a vehicle stop state, the OD off state is automatically released.

Figure 12:
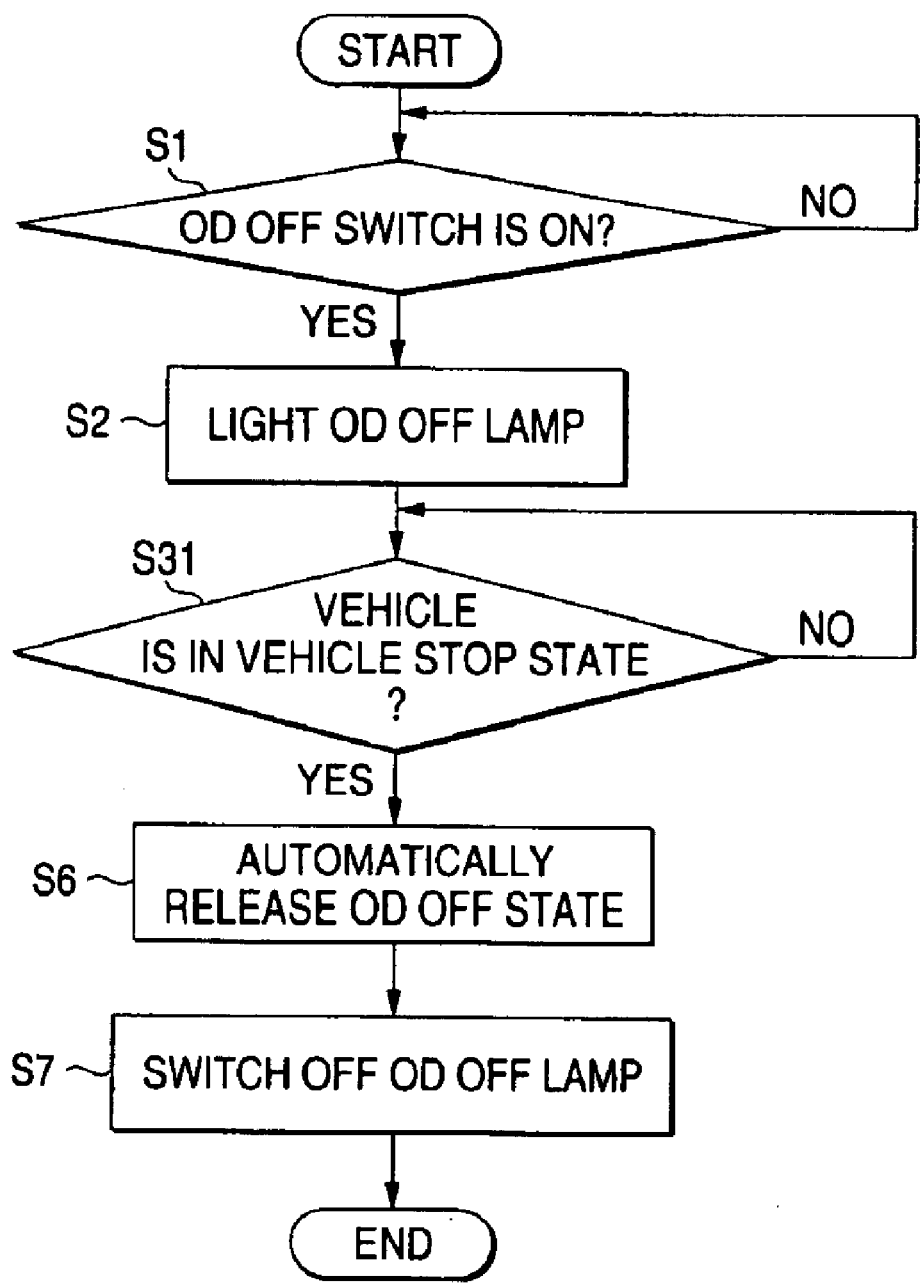
FIG. 12 is a flowchart to show the processing operation performed by a microcomputer of the control apparatus of the automatic transmission according to the ninth embodiment of the invention.
Figure 13:
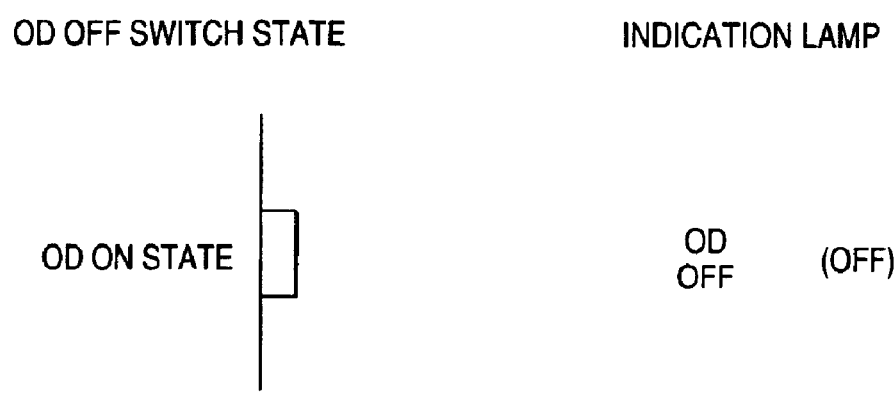
FIGS. 13(a) and 13(b) are schematic drawings that show the operation state of an OD off switch in a related art, placed in a vehicle.
Figure 13:
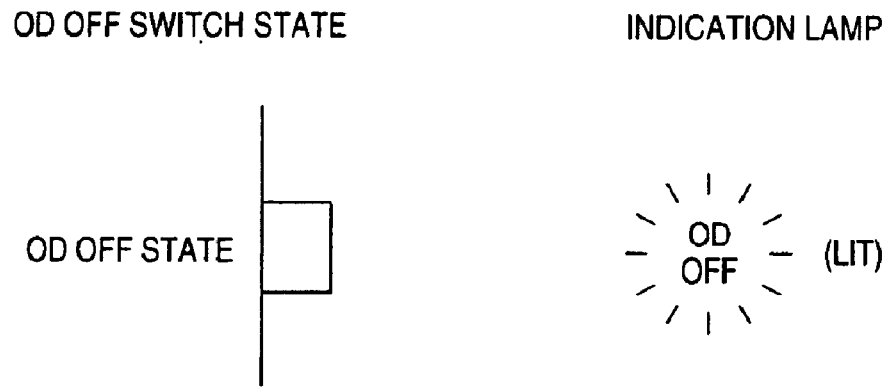

The processing operation of automatically releasing the OD off state performed by the microcomputer 4H in the control apparatus of the automatic transmission according to the ninth embodiment will be discussed with reference to a flowchart of FIG. 12. Steps identical with those previously described with reference to FIG. 2 are denoted by the same step numbers in FIG. 12 and will not be discussed again.

First, at step S1, whether or not the on signal of the OD off switch 8, namely, a signal for setting the OD off state is detected is determined. If it is determined that the on signal of the OD off switch 8 is detected, control goes to step S2 and an OD off lamp 10 indicating that the state is switched to the OD off state is lit and control goes to step S31.

At step S31, whether or not the vehicle is in a vehicle stop state is determined. If it is determined that the vehicle is in the vehicle stop state, control goes to step S6 and the OD off state is automatically released. Then, control goes to step S7 and an OD off lamp 10 is switched off and the processing is terminated. On the other hand, if it is not determined at step S31 that the vehicle is in the vehicle stop state, control returns to step S31. Whether or not the vehicle is in the vehicle stop state can be determined by determining that the vehicle speed becomes 0 based on the vehicle speed data input from a vehicle speed sensor 12, determining that a predetermined time at a predetermined idling level has elapsed based on the engine speed input from an engine speed sensor 13, or determining that the shift lever is set to the parking position based on the shift lever position input from a shift lever position detection switch 14.

According to the control apparatus of the automatic transmission according to the ninth embodiment, even if the driver does not again operate the OD off switch 8 for releasing the OD off state, the OD off state is automatically released if the vehicle becomes the vehicle stop state. Degradation of the fuel economy performance caused by the driver who forgets about releasing the OD off state can be prevented, and an increase in the content of hazardous substance in exhaust gas can also be prevented and adversely affecting the environment can also be decreased.

What is claimed is:

1. A control apparatus of an automatic transmission comprising:
    a gear change control section which detects an on signal of an overdrive (OD) off switch and performing OD off control;
    an OD off automatic release setting section which allows a user to set whether or not an OD off state is to be automatically released;
    an automatic release set state detection section which detects the automatic release set state in the OD off automatic release setting section; and
    an OD off automatic release section which automatically releases the OD off state, when a vehicle becomes a predetermined deceleration state or the vehicle is in a stop state and the on signal of the OD off switch and the automatic release set state in the OD off automatic release setting section are detected, irrespective of an ignition state of the vehicle.

2. The control apparatus according to claim 1, further comprising a vehicle speed detection section which detects vehicle speed and is connected to the OD off automatic release section,
    wherein when the vehicle speed detected by the vehicle speed detection section becomes equal to or less than a predetermined value, the OD off automatic release section automatically releases the OD off state.

3. The control apparatus according to claim 1, further comprising an engine speed detection section which detects engine speed of the vehicle and is connected to the OD off automatic release section,
    wherein when the engine speed detected by the engine speed detection section becomes equal to or less than a predetermined value, the OD off automatic release section automatically releases the OD off state.

4. The control apparatus according to claim 1, further comprising a press time measurement section which measures press time of a brake pedal of the vehicle and is connected to the OD off automatic release section,
    wherein when the press time of the brake pedal measured by the press time measurement section reaches a predetermined time, the OD off automatic release section automatically releases the OD off state.

5. The control apparatus according to claim 1, further comprising a handbrake operation detection section which detects brake operation of a handbrake of the vehicle and is connected to the OD off automatic release section,
    wherein when the brake operation of the handbrake is detected by the handbrake operation detection section, the OD off automatic release section automatically releases the OD off state.

6. The control apparatus according to claim 1, further comprising a shift lever position detection section which detects a shift lever position of the vehicle and is connected to the OD off automatic release section,
    wherein when the shift lever being set to a parking position is detected by the shift lever position detection section, the OD off automatic release section automatically releases the OD off state.

7. The control apparatus according to claim 1, further comprising:
    a vehicle speed detection section which detects vehicle speed and is connected to the OD off automatic release section; and
    an engine speed detection section which detects engine speed of the vehicle and is connected to the OD off automatic release section,
    wherein when the vehicle speed detected by the vehicle speed detection section becomes equal to or less than a predetermined value and the engine speed detected by the engine speed detection section becomes equal to or less than a predetermined value, the OD off automatic release section automatically releases the OD off state.

8. The control apparatus according to claim 1, further comprising:
    a press time measurement section which measures press time of a brake pedal of the vehicle and is connected to the OD off automatic release section; and
    a vehicle speed detection section which detects vehicle speed and is connected to the OD off automatic release section,
    wherein when the press time of the brake pedal measured by the press time measurement section reaches a predetermined time and the vehicle speed detected by the vehicle speed detection section becomes equal to or less than a predetermined value, the OD off automatic release section automatically releases the OD off state.

9. The control apparatus according to claim 1, further comprising:
    a press time measurement section which measures the press time of a brake pedal of the vehicle and is connected to the OD off automatic release section; and
    an engine speed detection section which detects engine speed of the vehicle and is connected to the OD off automatic release section,
    wherein when the press time of the brake pedal measured by the press time measurement section reaches a predetermined time and the engine speed detected by the engine speed detection section becomes equal to or less than a predetermined value, the OD off automatic release section automatically releases the OD off state.

10. A control apparatus of an automatic transmission comprising:
    a gear change control section which detects an on signal of an overdrive (OD) off switch and performing OD off control;

an OD off automatic release setting section which allows a user to set whether or not an OD off state is to be automatically released;

an automatic release set state detection section which detects the automatic release set state in the OD off automatic release setting section;

an OD off automatic release section which automatically releases the OD off state, when a vehicle becomes a predetermined deceleration state or the vehicle is in a stop state and the on signal of the OD off switch and the automatic release set state in the OD off automatic release setting section are detected; and a vehicle speed detection section which detects vehicle speed and is connected to the OD off automatic release section, wherein when the vehicle speed detected by the vehicle speed detection section becomes equal to or less than a predetermined value, the OD off automatic release section automatically releases the OD off state.

* * * * *